(No Model.)
M. ADLER.
WHEEL TIRE.
No. 536,502. Patented Mar. 26, 1895.
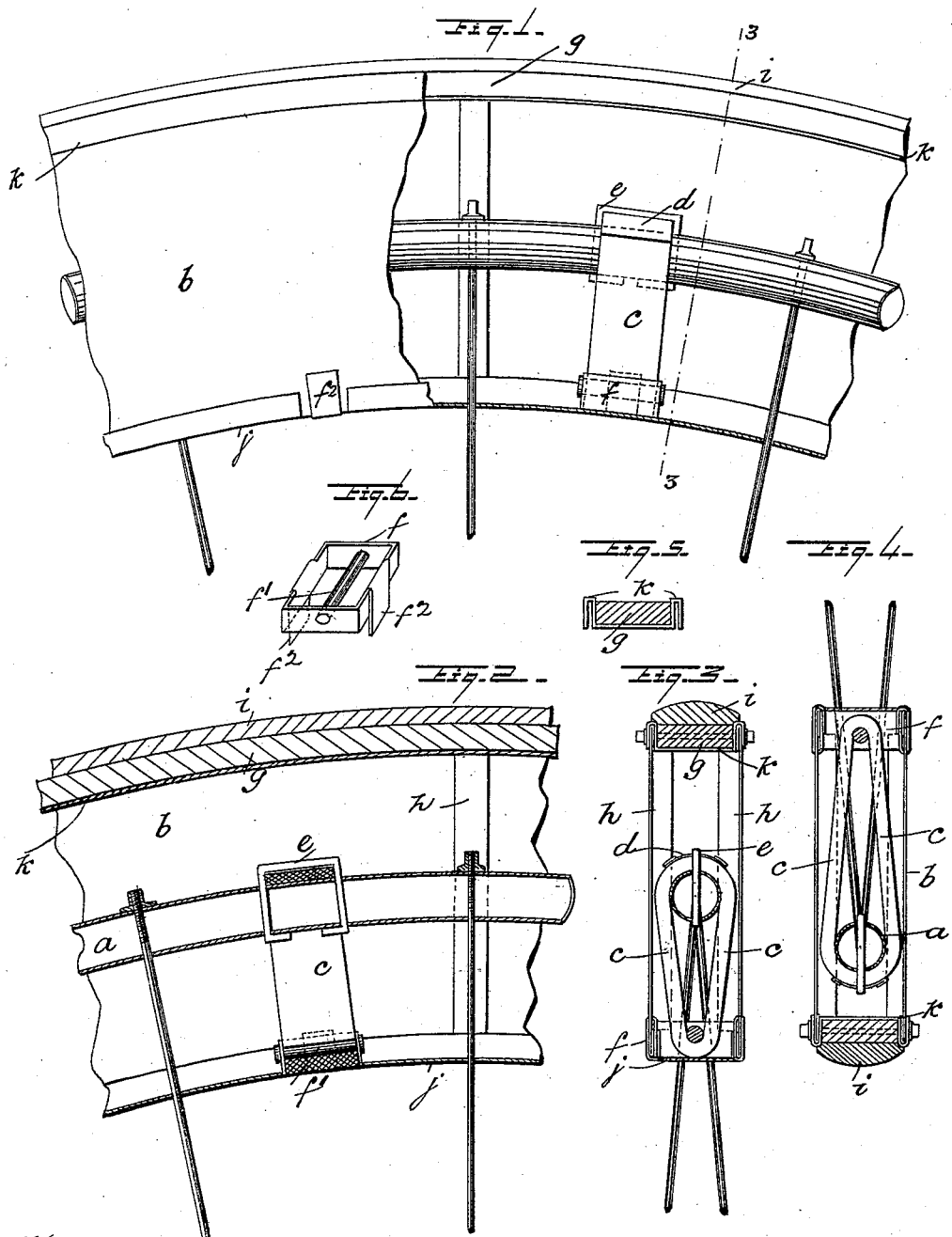
Witnesses
Inventor
Maurice Adler
by his Attorney

UNITED STATES PATENT OFFICE.

MAURICE ADLER, OF AMSTERDAM, NETHERLANDS.

WHEEL-TIRE.

SPECIFICATION forming part of Letters Patent No. 536,502, dated March 26, 1895.

Application filed January 9, 1895. Serial No. 534,410. (No model.)

*To all whom it may concern:*

Be it known that I, MAURICE ADLER, a subject of the Queen of the Netherlands, and a resident of Amsterdam, Netherlands, have invented certain new and useful Improvements in Wheel-Tires, of which the following is a specification.

This invention relates to wheel tires and is illustrated in the annexed drawings, in which—

Figure 1 is a side elevation partly in section showing the tire with part of the rim and spokes of a wheel. Fig. 2 is a central section thereof in the plane of the wheel. Fig. 3 is a cross section on line 3—3 Fig. 1. Fig. 4 is a similar cross section showing the parts in the position they tend to occupy when the wheel is resting upon the ground and bearing a load as seen in a cross section vertically to the center of contact with the ground. Fig. 5 is a detail view of a part of the tire. Fig. 6 is a detail view in perspective of another part thereof.

The tire comprises the two annular parallel plates $b$ $b$ of metal, the outer and inner edges of which are strengthened by turning over the metal and folding it back upon itself. The diameter of the outer edges of these annular plates is somewhat larger than the diameter of the outermost part of the wheel rim, and the diameter of the inner edges of the said plates is somewhat less than that of the innermost part of the wheel rim. The outer edges of the plates $b$ $b$ are connected together by a metal band $k$ the cross sectional shape of which is shown in Fig. 5. This band forms a channeled or grooved rim to the casing composed of plates $b$ $b$ and band $k$ with its central recessed part while its edges at each side overlap and hold the two plates $b$ $b$ respectively by their outer edges. The recessed rim constituted by the band $k$ is filled up by a wooden band $g$, the joining line of the wooden band $g$ and of the metal band $k$ being at the same place of the circumference of the tire. On the wooden band $g$ is cemented a rubber band $i$ which projects beyond the remaining parts and forms the running surface of the tire.

The box or casing composed of the parts above described incloses the wheel rim $a$ in such a way that, subject to the tension of the suspending bands hereinafter described, the casing has free play upon the rim $a$ in any direction in the plane of the wheel. The rim $a$ is preferably rounded on its outer side and may conveniently be made of a hollow tube. At suitable distances apart flat elastic endless bands $c$ surround this rim $a$ and pass also each about a pin $f'$ carried across a rectangular metal frame $f$ adapted to nicely fit between the inner edges of plates $b$ $b$ and having the ears $f^2 f^2$ overlapping the said inner edges of plates $b$ $b$. The frames $f$ thus connect the two plates $b$ $b$ together at their inner edges and serve as means for suspending the tire formed by the parts $b$, $f$, $k$, $g$, $i$ from the rim $a$ through the elastic connections $c$. To hold the bands $c$ in place on the rim $a$ wires $e$ pass across said bands and down through perforations in the rim $a$, their ends projecting on the inner side of the rim, being bent over to secure the wire in place. To prevent the wires $e$ from cutting into the band $c$, metal guard plates $d$ are interposed between the bands $c$ and the wires $e$. To cause the tire to move on the rim easily but without side play, hard-wood bars $h$ are placed in the tire and occupy radial positions in pairs on each side of the rim $a$.

A light cover $j$ of celluloid or other substance may be fitted over the inside edges of the plates $b$ so as to inclose the space between said plates from the inside.

I claim as my invention—

1. The combination with a wheel rim of a casing composed of two parallel side plates, a band connecting said plates at their outer edges, a running surface tire on said band, cross connections for the inner edges of said plates and elastic bands connecting said cross connections with the wheel rim within said casing substantially as set forth.

2. The combination with a wheel rim of a casing composed of two annular parallel side plates $b$, a band having up and back curved edges to receive the outer edges of said side plates, a filling band in the aforesaid band, a surface band on said filling band, connecting frames $f$ fitted on the inner edges of said plates $b$, pins $f'$ therein and elastic bands $c$ encircling said pins $f'$ and the wheel rim within said casing, substantially as set forth.

In witness whereof I have signed this specification in presence of two witnesses.

MAURICE ADLER.

Witnesses:
 FRANCESCUS SCHARBORN,
 AUGUST SIEGFRIED DOCER.